(12) United States Patent
Turnidge

(10) Patent No.: US 7,039,691 B1
(45) Date of Patent: May 2, 2006

(54) JAVA VIRTUAL MACHINE CONFIGURABLE TO PERFORM AS A WEB SERVER

(75) Inventor: Todd D. Turnidge, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 537 days.

(21) Appl. No.: 09/585,945

(22) Filed: Jun. 2, 2000

(51) Int. Cl.
*G06F 15/177* (2006.01)

(52) U.S. Cl. .................... 709/221; 709/220; 709/222; 709/223

(58) Field of Classification Search ........ 709/220–225, 709/218, 219; 717/124, 125
See application file for complete search history.

(56) References Cited

U.S. PATENT DOCUMENTS 6,044,398 A * 3/2000 Marullo et al. ............. 709/219
6,161,139 A * 12/2000 Win et al. ................... 709/225

(Continued)

FOREIGN PATENT DOCUMENTS

WO   WO 99/22288   5/1999

OTHER PUBLICATIONS

Canon et al., "A Virtual Machine Emulator for Performance Evaluation" Feb. 1980, Publications of the ACM, vol. 23, No. 2, pp. 71-80.*

"Page Info For Class Acme.Serve.Serve", http://web.archive.org/web/2000052001.
"Page Info For Java Platform Debugger," http://developer.java.sun.com/developer/earlyAccess/jpda/doc/index.html.
Chintalapati, et al., "Web Server and Browser Design Considerations," 1997, Annual Review of Communications.
"Disk Drive With Embedded Hyper-Text Markup Language Server," Dec. 1995, IBM Technical Disclosure Bulletin, vol. 38, No. 12.
"Class Acme.Serve. Serve" http://web.archive.org/web/20000520012649.
Java™ Platform Debugger Architecture, http://developer.java.sun.com/developer/earlyAccess/jpda/doc/index.html.

*Primary Examiner*—Bunjob Jaroenchonwanit
*Assistant Examiner*—Dohm Chankong
(74) *Attorney, Agent, or Firm*—Beyer, Weaver & Thomas, LLP.

(57) ABSTRACT

A virtual machine, such as a Java™ virtual machine, is configured to operate as a web server so that users, using a browser, can make general-purpose inquiries into the state of the virtual machine or, in some cases, mutate the state of the VM. A "browsable" VM contains a network traffic worker, such as an HTTP thread, a services library, and a VM operations thread, which is an existing component in most virtual machines. The network traffic worker and the VM operations thread communicate through a request data structure. The VM operations thread generates a reply to the request upon receiving a request data structure from the traffic worker. Such a reply can be in the form of an HTTP response containing HTML or XML pages. These pages are transmitted back to the browser/user by the network traffic worker.

38 Claims, 5 Drawing Sheets

U.S. PATENT DOCUMENTS 6,185,619 B1 * 2/2001 Joffe et al. .................. 709/229
6,295,643 B1 * 9/2001 Brown et al. ................ 717/148
6,327,609 B1 * 12/2001 Ludewig et al. ............ 709/203
6,433,794 B1 * 8/2002 Beadle et al. ................ 345/700
6,603,488 B1 * 8/2003 Humpleman et al. ....... 715/771
6,788,980 B1 * 9/2004 Johnson ......................... 700/1

* cited by examiner

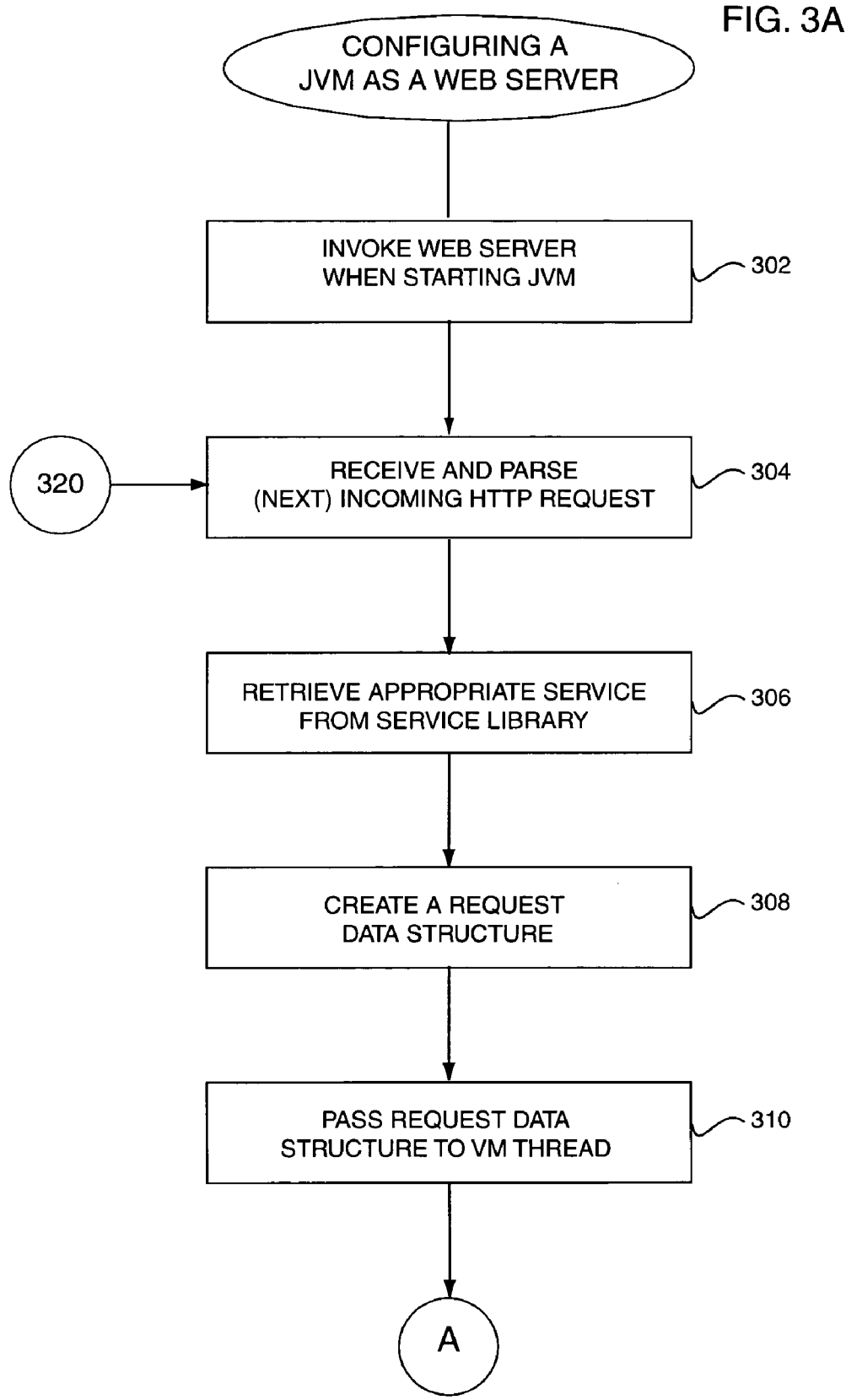

JAVA VIRTUAL MACHINE CONFIGURABLE TO PERFORM AS A WEB SERVER

BACKGROUND OF THE INVENTION

1. Field of the Invention

The present invention relates generally to virtual machines. More specifically, it relates to enhancing a Java™ virtual machine for allowing inspection and modification of the state of the virtual machine through configuring the virtual machine to perform as a Web browser.

2. Discussion of Related Art

Over the last several years, the Java™ language and platform have become more widespread and their use is continually on the rise. An increasing number of applications are written in the Java™ language and are using a Java™ virtual machine. Java™ applications are being used increasingly in components, such as Web appliances, set-top boxes, and other types of computing devices. As the use of the Java™ virtual machine, needed to execute Java™ applications, increases, the demand for improving the development lifecycle of a Java™ application and improving the efficiency of a Java™ application becomes imperative. Getting a better understanding of the performance of the Java™ virtual machine is a step in this direction. However, as acknowledged in the field, Java™ virtual machines are seen as black boxes; opaque components that perform a crucial function but whose internal states are generally inaccessible to the users.

Presently, some tools are available that allow those working in particular areas, for example, Java™ application debugging, to get information on the state of a Java™ virtual machine pertaining specifically to the task of debugging an application. By using a debugging protocol, it is possible to ask the virtual machine questions about its state without interfering with its other operations. Another example is using profiling protocols to get specific information related to profile information. These tools or protocols typically require their own client and do not talk to a Java™ virtual machine using a Web browser.

One significant drawback of using these tools is that they are rigid and only provide a narrow band of information about the state of the virtual machine to the user. Furthermore, the information provided to the user, while specific to a particular purpose, is still rather high-level and gives the user a "bird's eye" view of the Java™ virtual machine state. Naturally, most users would prefer having more detailed, low-level information about the state and performance of the virtual machine if possible. In addition, users, whether VM developers, application developers, or enterprise users, would like to be able to make queries to the VM of a general nature, and not be limited to a specific task.

Therefore, it would be desirable to have a mechanism that allows interactively browsing the dynamic state of a Java™ virtual machine while it is executing an application or even while it is idle. Furthermore, it would be desirable to broaden the information returned to the user beyond a particular purpose or space. That is, allow the user to ask the virtual machine questions of a general nature yet get, as output, detailed, low-level state information in a convenient form. It would also be desirable to allow users to reliably query the state of the virtual machine using a widely available existing tool, without having to create a separate client host and with negligible interference to the virtual machine.

SUMMARY OF THE INVENTION

According to the present invention, virtual machines, methods, and computer-readable media are disclosed for configuring a virtual machine to operate as a web server so that users can inspect and/or modify the state of the virtual machine, such as a Java™ virtual machine using their browsers. In one aspect of the present invention, a virtual machine configurable to function as a web server is described. A browsable virtual machine has several components. One component is a request handler worker that handles incoming queries relating generally to the virtual machine. In one embodiment, the request handler worker is an HTTP thread and the incoming request is in HTTP format. The virtual machine has a library of services which can be used to construct responses to the requests. A service is used to perform specific operations in the virtual machine to respond to the incoming query. Another component is an operations worker for constructing output containing a reply to the incoming query. The reply typically provides insight into or mutates the operation of the virtual machine.

In another aspect of the present invention, a method of handling an incoming query into the state of the virtual machine or a query to mutate the state of the virtual machine is described. Such a query will typically originate from a web browser. In the virtual machine, a network traffic worker for receiving and transmitting requests and responses, respectively, is invoked. This network traffic worker can be an HTTP thread for handling requests in HTTP format. Once the request is received by the network traffic manager, the request is processed to determine the service called for in the request. The service can be invoked by accessing a service library. The network traffic manager creates a request data structure. The request data structure is passed to a virtual machine operations worker which is responsible for constructing a response to the request. The response may be passive information on the state of the virtual machine (e.g., memory allocations) or the response may be a mutation of the state of the virtual machine. The response is then transmitted to the browser or user. This can be done by the network traffic manager.

BRIEF DESCRIPTION OF THE DRAWINGS

The invention will be better understood by reference to the following description taken in conjunction with the accompanying drawings in which:

FIGS. 3A and 3B are flow diagrams of a process of implementing a web server in a Java™ virtual machine in accordance with one embodiment of the present invention.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment.

To the contrary, it is intended to cover alternatives, modifications, and equivalents as may be included within the spirit and scope of the invention as defined by the appended claims.

As more software engineers work with the Java™ programming language to create Java™ applications, there will be an increasing desire to have a better understanding of how their Java™ applications perform through real-time observation of their programs executing. The application development lifecycle is made more efficient if users can study executing applications with ease, which is presently difficult to do with generally opaque Java™ virtual machines.

In accordance with one embodiment of the present invention, there is provided a Java™ virtual machine that can perform as a web server as described in the various figures. This web server, when enabled in a Java™ virtual machine, provides transparent access, or a small window, to the state of the JVM. This "browsable VM" allows end-users to gather insights about their application and the application's runtime characteristics. The user can glean insights, for example, about where the application is spending its time during steady-state runtime (ignoring startup and shutdown overhead) in order to improve performance, as well as identifying potential memory inefficiencies. Generally, information most useful to application and VM developers is either application monitoring information or information related to a JVM internal problem.

The JVM generates HTML pages, containing the information requested, on demand to reflect the virtual machine's internal state. This allows a user to observe all Java™ threads, all Java™ objects, and the time spent by the JVM in individual Java™ methods (profiling), all in real time. It can also enable remote diagnostics, remote debugging, and remote configuration and control of the JVM.

Figure 1:
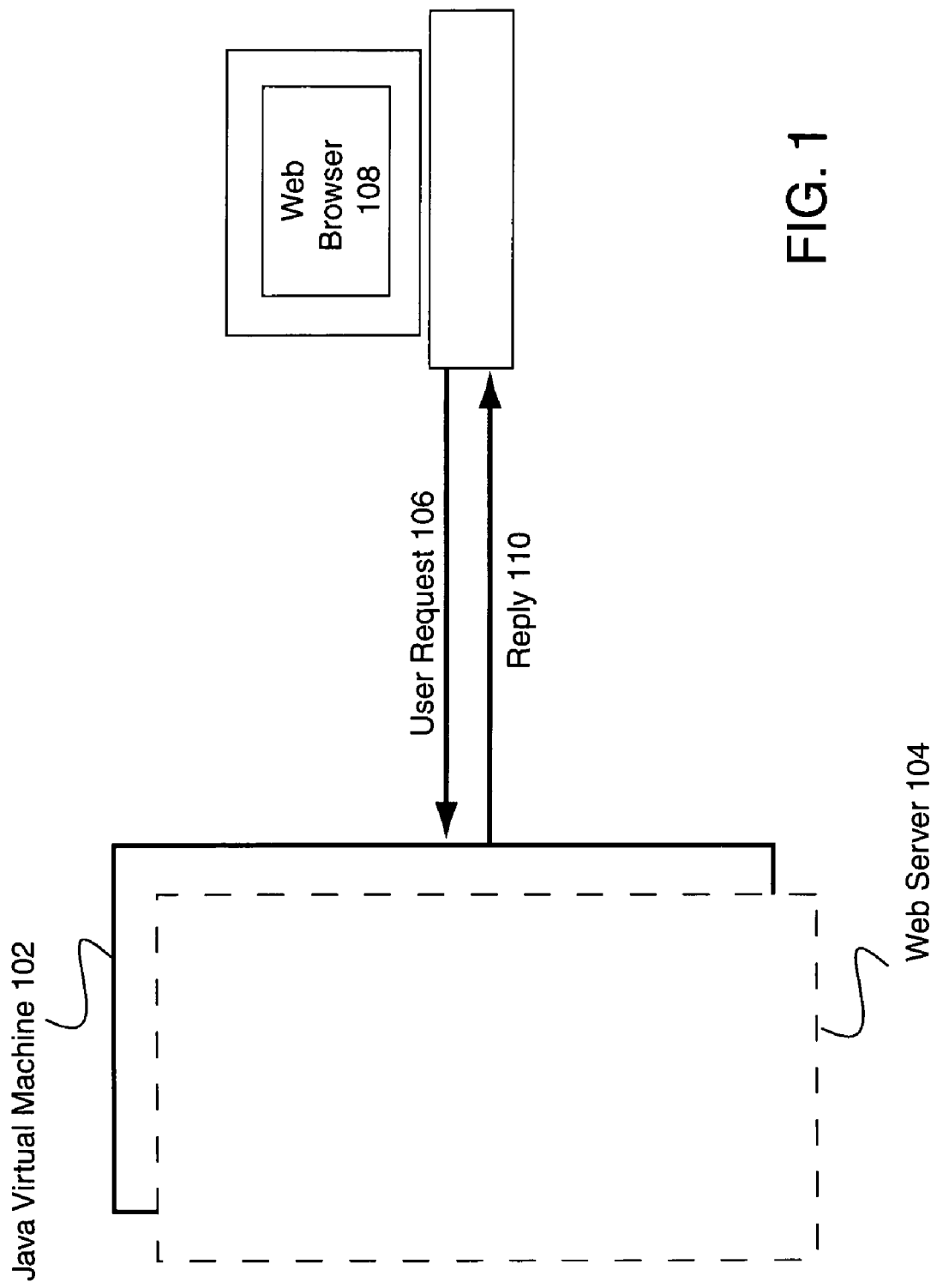
FIG. 1 is an overview block diagram of how a browsable virtual machine operates in accordance with one embodiment of the present invention.

To further illustrate the foregoing, FIG. 1 is an overview block diagram of how a browsable Java™ virtual machine operates with a web browser in accordance with one embodiment of the present invention. A Java™ virtual machine (JVM) 102 can be enabled through JVM command line options at start up to operate as a web server 104. Web server 104 provides a window into the state and performance of JVM 102, described in greater detail in FIG. 2. A user wanting to learn more about the state of JVM 102 can send a request 106 to JVM 102 via a web browser 108. Web browser 108 is essentially location-independent as long as it has access to JVM 102 (security features are described below), performing as web server 104. Web server 104 sends a reply or answer 110 back to web browser 108. Processes for receiving the request and constructing a reply are described in FIGS. 3A and 3B. In the described embodiment, user request 106 is in HTTP formal and reply 110 is in the format of an HTTP response containing an HTML document.

Figure 2:
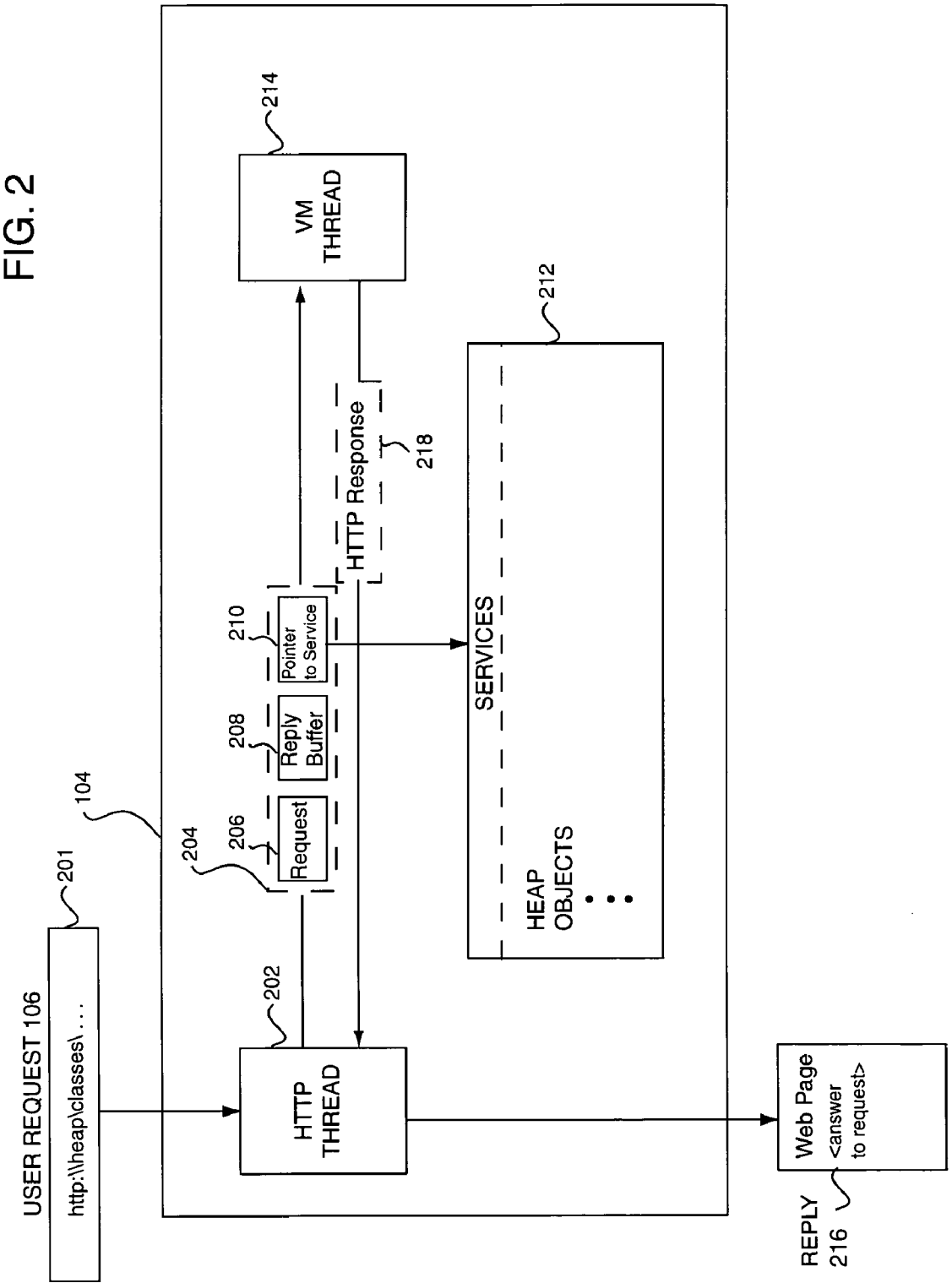
FIG. 2 is a block diagram of a Java™ virtual machine enabled to function as a web server in accordance with one embodiment of the present invention.

FIG. 2 is a block diagram of JVM 102 enabled to function as web server 104 in accordance with one embodiment of the present invention. A more generic description of JVM 102 is provided in FIG. 4. User request 106 is received by JVM 102 functioning as web server 104. One format of user request 106 is the HTTP format as shown in FIG. 2 in box 201. Request 106 comes from web browser 108 pointing to JVM 102 over a secure or non-secure HTTP connection. User request 106 is received by an HTTP daemon thread 202. HTTP thread 202 exists when web server 104 is enabled, typically at JVM 102 start up. HTTP thread 202 routes incoming and outgoing traffic from web browser 108. It receives and processes HTTP requests made to web server 104 and routes replies back to the browser. HTTP thread 202 and other components are introduced here in FIG. 2 and described in greater detail below.

HTTP thread 202 performs certain operations on user request 106 and a request data structure 204 is created. Request data structure 204 contains a request segment 206 of user request 106, an empty reply buffer 208, and a pointer to a service 210 in a services library 212. Services library 208 contains services available for handling requests from users. A virtual machine (VM) thread 214 receives data structure 204 and constructs a reply or answer 216 to the request. More specifically, VM thread 214 sends reply buffer 218 storing an HTTP response containing an HTML document.

As is known in the field, VM thread 214 is a worker in JMV 102 that handles virtual machine operations and starting up the virtual machine. Before VM thread 214 receives the request in the form of data structure 204, the request has been parsed and placed in condition for VM thread 214 to begin constructing a reply. VM thread 214 generates and writes HTML pages into HTTP response 218 that make up reply 216. These pages are inserted in reply buffer 208, now buffer 218 holding HTTP response and sent back to HTTP thread 202. Thread 202 then send a reply 216 back to the web browser. In other preferred embodiments, workers can be implemented using other constructs instead of threads.

Figure 3B:
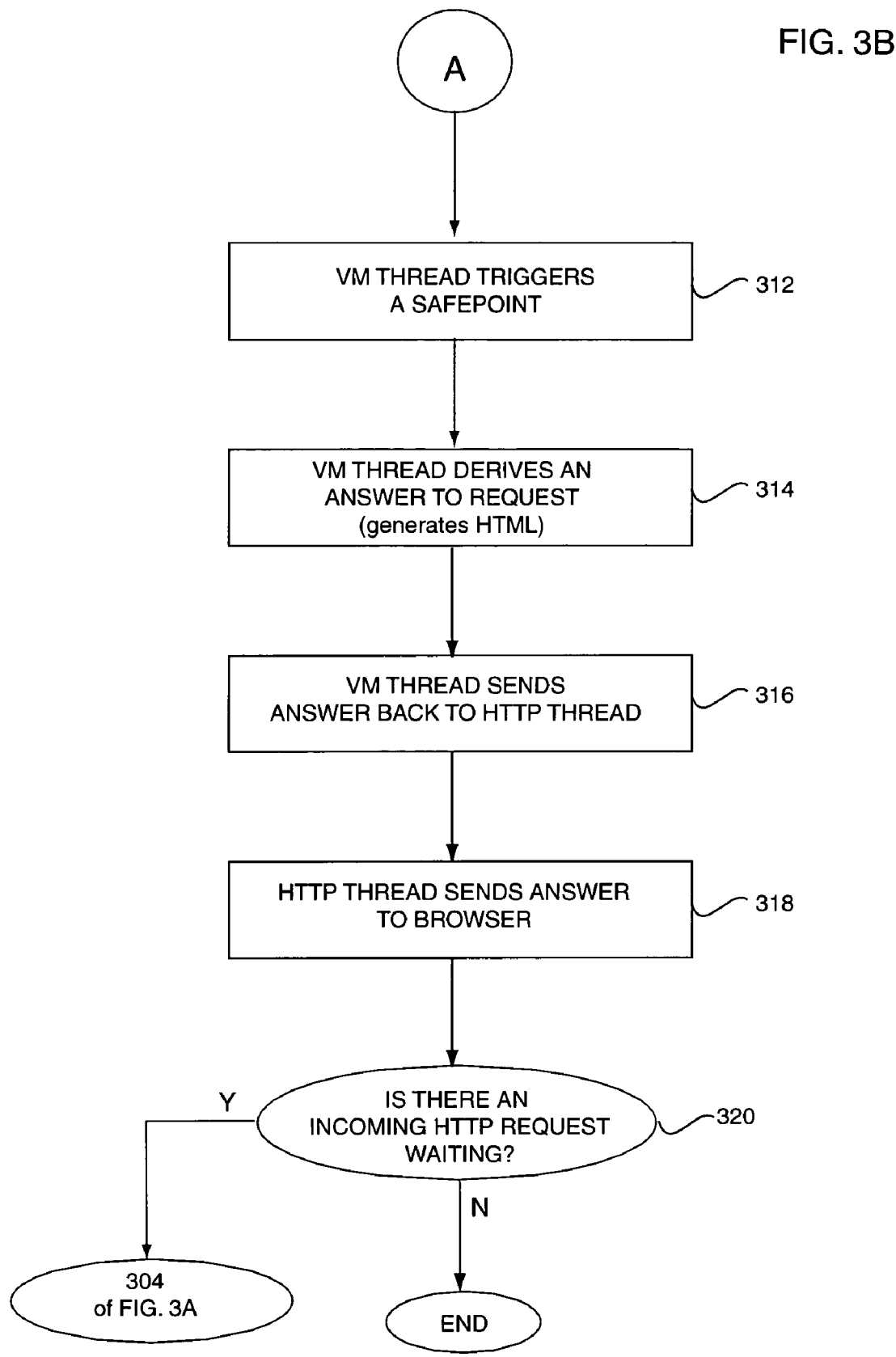

FIGS. 3A and 3B are flow diagrams of a process for implementing a web server in a Java™ virtual machine in accordance with one embodiment of the present invention. At step 302 a web server is invoked when the JVM is started and a web server flag is selected on the command line at JVM startup. In addition, a port number to open a socket is selected, such as port 80, commonly used for web servers. For example, the following command can be used:

java–XX: +EnableHttp–XX: InsecureHttpPort=8001
    app

By selecting the web server option at startup, an HTTP thread is created and bound to the selected port. This thread traffics incoming HTTP requests to the JVM and outgoing replies. At step 304 an incoming HTTP request is received and parsed into substrings. When a browser connects with the VM to make a request, a two-way connection is established which is maintained until a reply can be constructed and returned, at which point the connection is closed. The format of an HTTP request is specified in a set of specifications and drafts available from www.w3.org. In one embodiment of the present invention, the HTTP request is decomposed (parsed) according to the HTTP/1.0 standard (also known as Informational RFC 1945). Once parsed, the service name is obtained by inspecting the Request-URI portion of the HTTP request and can be checked against a service library. If the service name or a particular version of a service is not found, a message is sent to the user.

Once the incoming request is parsed, at step 306 the service, such as heap, is retrieved from a services library by the HTTP thread. Valid HTTP services are listed in the library, each listing accompanied by prefixes. The types of services can vary on different JVMs and can be added to as needed. A few examples are heap objects, profiling, memory usage, and thread stacks. A memory usage service can be used to display heap usage statistics and can show heap profile by class. Data on each class can be displayed such as source file name, constant pool, methods, and fields. Two internal options are heap profile for system classes and showing heap usage by generation. A profiling service can be enabled/disabled at any time thereby limiting the performance impact to a time when the user actually wants to gather profile information. It allows a user to gather profiling data around specific end-user actions, or only during a steady state or when there is a slowdown. Several options are available such as showing a full profile, profiles of individual threads, or a "flat" profile. A threads service allows a user to examine current running and waiting threads.

At step 308 the HTTP thread creates a request data structure for the particular request. As noted above, one component of the data structure is a pointer to a service in the service library. At step 306 the pointer to the library service is also set. The data structure also contains the request. Thus, the incoming request will have a request which includes a particular service and specific parameters for that service. The HTTP thread also creates a buffer in the data structure to hold the answer to the request in the form of an HTTP response containing an HTML document. The format on an HTTP response is specified in a set of documents available from www.w3.org. In one embodiment of the present invention, the HTTP response is built in the form described in the HTTP/1.0 standard (also known as Informational RFC 1945). In other preferred embodiments, the buffer can hold XML pages.

At step 310 the HTTP thread passes the request data structure to the virtual machine (VM) thread using standard communication methods. More specifically, the data structure is placed in a VM queue from which the VM thread reads inputs. This allows the VM thread to process input in an orderly and consistent manner. The VM thread services all types of requests (e.g., garbage collection, loading classes, etc.). In the described embodiment, a single user HTTP request is processed at any given time. If a second HTTP request comes in, the HTTP thread is blocked on a VM queue lock until the first operation completes. Requests are not handled as interrupts; the HTTP thread has to ask for a new connection for the VM thread to process a new request. In the described embodiment, the VM thread is placed at a safepoint when it receives a request data structure.

Once the VM thread receives the request data structure, it triggers a safepoint at step 312 of FIG. 3B. A safepoint is a well-known operation in the JVM which causes it to temporarily stop all operations. This is done to prevent the state of the VM from changing while the VM is being evaluated and to ensure that the JVM will act reliably. The extent and degree of this evaluation can vary greatly depending on the request. However, in these cases a safepoint operation is desirable. Some types of operations can be performed without triggering a safepoint. At step 314 the VM thread derives an answer or reply to the request. In the described embodiment, the request data structure passed to the VM thread has been processed, or filtered, and placed in a condition in which it is unlikely that the VM thread will encounter any exceptions in the request. If at any point in the process an unrecognizable request or command is encountered, a standard NOT FOUND message is sent to the browser.

In other preferred embodiments, it is possible that each incoming request go straight to VM thread and the VM thread decides how to handle the particular URL. A traffic networking worker, such as the HTTP thread may only be used to receive and transmit requests and replies, and nothing else. However, in the described embodiment, the HTTP thread is used to also filter out bad requests, thereby reducing the risk that the VM thread will crash or be corrupted.

An answer to the request is derived using the particular library service pointed to in the request data structure. The JVM uses this service in a standard way to gather whatever information it needs for the answer. For example, with a heap walking request for a particular class, the VM will walk through or explore its memory and determine how much memory is being used by a particular class. Thus, at step 314 the VM thread generates HTML directly into the reply buffer. In other preferred embodiments, XML is generated into the reply buffer. As is known in the field, there are header fields that need to be filled in for an HTML page. All this can be done with very low overhead and memory usage by the VM. Most of the processing done to derive an answer is done by performing the appropriate service. At step 316 the JVM has generated a reply and sends it back to the HTTP thread in the form of HTML or XML pages. At step 318, the HTTP thread sends the answer to the browser that sent the request. At step 320 the HTTP thread checks whether there is another HTTP request waiting to be received and processed. If there is, control returns to step 304 and the process is repeated. If not, the process ends.

The JVM can require that an incoming HTTP request be received over a secure HTTP connection, such as over a secure socket connection (e.g., SSL) using encryption, instead of a normal-text HTTP connection. This security can be important in situations where only certain users of the JVM can make certain types of requests into the state of the virtual machine. Using standard secure socket connections allows the VM operator to regulate which users have access to the internal state of the VM. Such users may have access to files containing passwords, credit cards, social security numbers, or other sensitive data in the VM.

Figure 4:
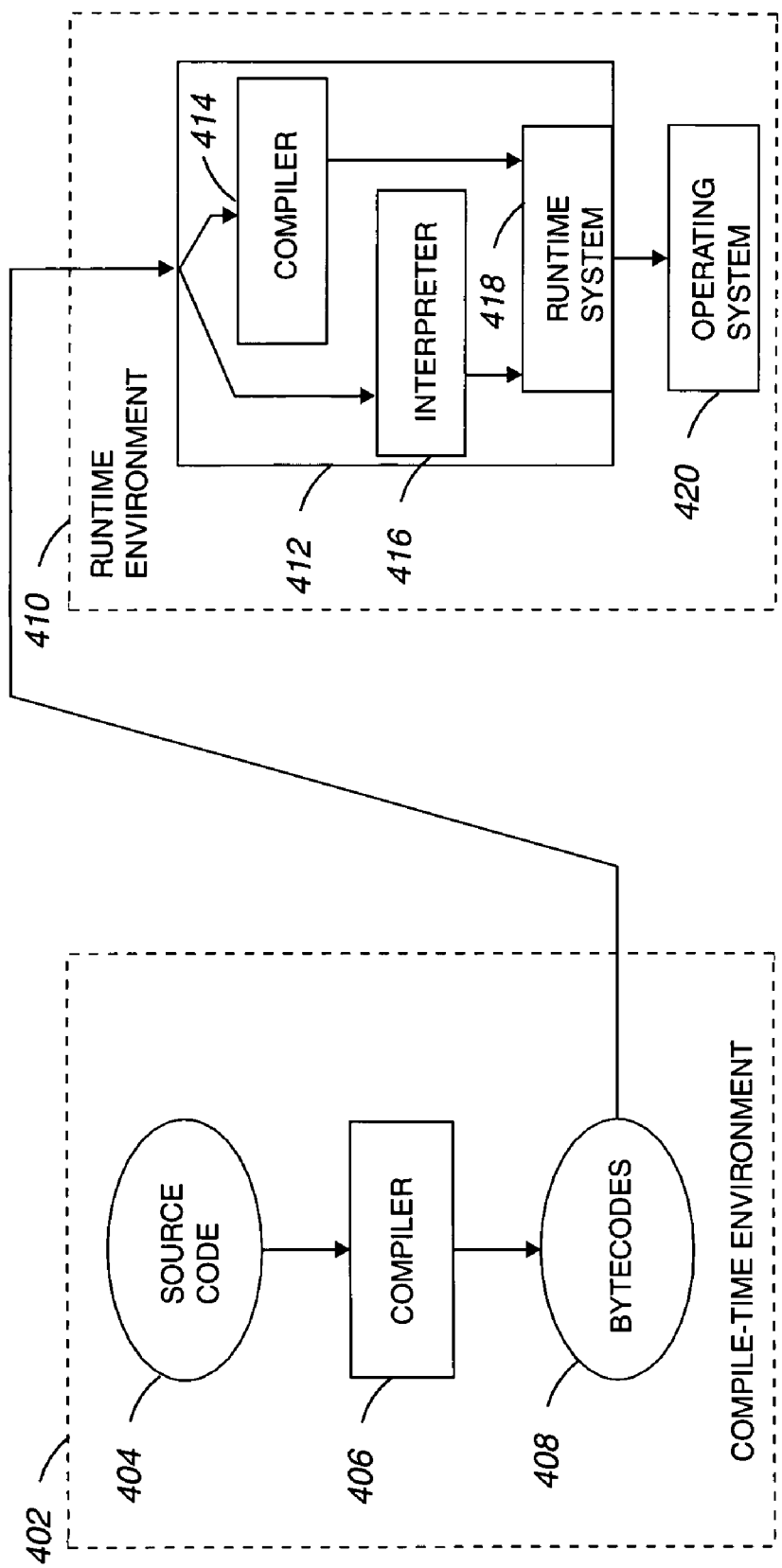
FIG. 4 is a diagrammatic representation of a virtual machine suitable for implementing the present invention.

FIG. 4 is a diagrammatic representation of a virtual machine suitable for implementing the present invention. When a computer program, e.g., a computer program written in the Java™ programming language, is executed, source code 404 is provided to a compiler 406 within compile-time environment 405. Compiler 406 translates source code 404 into bytecodes 408. In general, source code 404 is translated into bytecodes 408 at the time source code 404 is created by a software developer.

Bytecodes 408 may generally be reproduced, downloaded, or otherwise distributed through a network or stored on a storage device. In the described embodiment, bytecodes 408 are platform independent. That is, bytecodes 408 may be executed on substantially any computer system that is running on a suitable virtual machine 412.

Bytecodes 408 are provided to a runtime environment 410 which includes virtual machine 412. Runtime environment 410 may generally be executed using a processor or processors. Virtual machine 412 includes a compiler 414, an interpreter 416, and a runtime system 418. Bytecodes 408 may be provided either to compiler 414 or interpreter 416.

When bytecodes 408 are provided to compiler 414, methods contained in bytecodes 408 are compiled into machine instructions. In one embodiment, compiler 414 is a just-in-time compiler which delays the compilation of methods contained in bytecodes 408 until the methods are about to be executed. When bytecodes 408 are provided to interpreter 416, bytecodes 408 are read into interpreter 416 one bytecode at a time. Interpreter 416 then performs the operation defined by each bytecode as each bytecode is read into interpreter 416. That is, interpreter 416 "interprets" bytecodes 408, as will be appreciated by those skilled in the art. In general, interpreter 416 processes bytecodes 408 and performs operations associated with bytecodes 408 substantially continuously.

When a method is invoked by another method, or is invoked from runtime environment 410, if the method is interpreted, runtime system 418 may obtain the method from runtime environment 410 in the form of a sequence of bytecodes 408, which may be directly executed by interpreter 416. If, on the other hand, the method which is invoked is a compiled method which has not been compiled, runtime system 418 also obtains the method from runtime environment 410 in the form of a sequence of bytecodes 408, then may go on to activate compiler 414. Compiler 414 then generates machine instructions from bytecodes 408, and the resulting machine-language instructions may be executed directly by one or more processors. In general, the machine-language instructions are discarded when virtual machine 412 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the reply sent to the user may be in the form of XML pages, or other appropriate markup language, and need not be HTML pages. In another example, the HTTP thread may not parse the incoming request but rather pass it on directly to the VM thread for processing by the VM thread, which can simplify the design of the web server configuration. In addition, the services available for handling incoming requests can vary widely and be added to as needed. Accordingly, the present embodiments are to be considered as illustrative and not restrictive, and the invention is not to be limited to the details given herein, but may be modified within the scope and equivalents of the appended claims.

What is claimed is:

1. A virtual machine configurable to function as a browsable virtual machine (browsable VM), the virtual machine comprising:
   a request handler worker for handling an incoming query relating to an operational state of the virtual machine;
   a plurality of services wherein a service performs operations for replying to the incoming query; and
   an operations worker for generating output containing a reply to the incoming query, using at least one of the plurality of services, wherein the reply provides state information regarding the operation of the virtual machine, the reply in a format suitable for a browser; and
   a request data structure for transferring data between the request handler worker and the operations worker, the request data structure having a service pointer area that identifies the one of the plurality of services to be used by the operations worker for generating the reply to the incoming query, a response buffer area, and a segment query area.

2. A virtual machine as recited in claim 1 wherein the request handler worker is an HTTP thread.

3. A virtual machine as recited in claim 2 wherein the incoming query is in HTTP format.

4. A virtual machine as recited in claim 1 wherein the request handler worker further includes a query parser for parsing the incoming query such that one of the plurality of services is identified for use by the operations worker to generate the reply to the incoming query.

5. A virtual machine as recited in claim 1 wherein the request handler worker is created upon starting up the virtual machine.

6. A virtual machine as recited in claim 1 wherein the request handler worker functions as a network traffic manager for routing queries and responses.

7. A virtual machine as recited in claim 1 wherein the plurality of services contains in index of available services and parameters for each service.

8. A virtual machine as recited in claim 1 wherein the operation worker is a virtual machine operations thread.

9. A virtual machine as recited in claim 1 wherein the request handler worker creates the request data structure that identifies one of the plurality of services to be used by the operations worker for generating the reply to the incoming query.

10. A virtual machine as recited in claim 1 wherein the virtual machine is a Java™ virtual machine.

11. A method of handling an incoming request, in a virtual machine configurable to function as a browsable virtual machine (browsable VM), the method comprising:
    invoking a network traffic worker for receiving the request, the request relating to an operational state of the virtual machine;
    receiving the request from a browser;
    processing the request to determine a service needed to respond to the request, including parsing the request into segments thereby determining the service needed to respond to the request;
    creating a pointer to the service in a service library;
    creating a request data structure that identifies the service needed to respond to the request;
    effecting a response to the request by passing the request data structure to a virtual machine operations worker, wherein the response provides state information regarding the operation of the virtual machine based on the request data structure; and
    transmitting the response to the browser.

12. A method as recited in claim 11 further including invoking a web server in the virtual machine.

13. A method as recited in claim 12 further including creating a request thread.

14. A method as recited in claim 13 wherein receiving a request from a browser further includes establishing a secure HTTP connection where the request is an HTTP request.

15. A method as recited in claim 11 wherein creating a request data structure further includes:
    creating a first storage area for holding a pointer to the service needed to respond to the request;
    creating a second storage area for holding a segment of the request; and
    creating a third storage area for holding a response to the request.

16. A method as recited in claim 15 further including generating an HTTP response containing an HTML document into the third storage area of the request data structure.

17. A method as recited in claim 15 further including generating XML pages into the third storage area of the request data structure.

18. A method as recited in claim 11 further including performing operations in the virtual machine using the service and under the control of the virtual machine operations worker.

19. A method as recited in claim 11 further including stopping normal operation of the virtual machine while the request is acted upon.

20. A method as recited in claim 11 further including sending a response from the virtual machine operations worker to the network traffic worker.

21. A method as recited in claim 11 wherein transmitting the response to the browser further includes the network traffic manager sending the response to the browser.

22. A computer-readable medium containing programmed instructions arranged to handle an incoming request, in a virtual machine configurable to function as a browsable virtual machine (browsable VM), the computer-readable medium including programmed instructions for:
  invoking a network traffic worker for receiving the request, the request relating to an operational state of the virtual machine;
  receiving the request from a browser;
  processing the request to determine a service needed to respond to the request, including parsing the request into segments thereby determining the service needed to respond to the request;
  creating a pointer to the service in a service library;
  creating a request data structure identifying the service needed to respond to the request;
  effecting a response to the request by passing the request data structure to a virtual machine operations worker, wherein the response provides state information regarding the operation of the virtual machine based on the request data structure; and
  transmitting the response to the browser.

23. A virtual machine as recited in claim 1 wherein the state information includes application runtime information.

24. A virtual machine as recited in claim 1 wherein the state information includes steady-state runtime information.

25. A virtual machine as recited in claim 1 wherein the state information includes memory information.

26. A virtual machine as recite in claim 1 wherein the state information includes thread information.

27. A virtual machine as recited in claim 1 wherein the state information includes object information.

28. A virtual machine as recited in claim 1 wherein the state information includes profiling information.

29. A virtual machine as recited in claim 1 wherein the plurality of services include a heap objects service.

30. A virtual machine as recited in claim 1 wherein the plurality of services include a profiling service.

31. A virtual machine as recited in claim 1 wherein the plurality of services include a memory usage service.

32. A virtual machine as recited in claim 1 wherein the plurality of services include a threads service.

33. A method as recited in claim 11 wherein the state information includes application runtime information.

34. A method as recited in claim 11 wherein the state information includes steady-state runtime information.

35. A method as recited in claim 11 wherein the state information includes memory information.

36. A method as recited in claim 11 wherein the state information includes thread information.

37. A method as recited in claim 11 wherein the state information includes object information.

38. A method as recited in claim 11 wherein the state information includes profiling information.

* * * * *

UNITED STATES PATENT AND TRADEMARK OFFICE
CERTIFICATE OF CORRECTION

| | | |
|---|---|---|
| PATENT NO. | : 7,039,691 B1 | Page 1 of 1 |
| APPLICATION NO. | : 09/585945 | |
| DATED | : May 2, 2006 | |
| INVENTOR(S) | : Todd D. Turnidge | |

It is certified that error appears in the above-identified patent and that said Letters Patent is hereby corrected as shown below:

In the Claims:

In line 2 of claim 7 (column 8, line 10) change "in index" to --an index--.

In line 1 of claim 26 (column 10, line 5) change "as recite" to --as recited--.

Signed and Sealed this

Twenty-fourth Day of October, 2006

JON W. DUDAS
*Director of the United States Patent and Trademark Office*